US012746459B2

(12) United States Patent
Smart

(10) Patent No.: US 12,746,459 B2
(45) Date of Patent: Sep. 29, 2026

(54) PRIZE ACQUISITION ARCADE GAME WITH ROBOT

(71) Applicant: Smart Industries Corporation, Des Moines, IA (US)

(72) Inventor: Jeffrey T. Smart, Altoona, IA (US)

(73) Assignee: Smart Industries Corporation, Des Moines, IA (US)

(*) Notice: Subject to any disclaimer, the term of this patent is extended or adjusted under 35 U.S.C. 154(b) by 820 days.

(21) Appl. No.: 18/064,127

(22) Filed: Dec. 9, 2022

(65) Prior Publication Data

US 2023/0249058 A1 Aug. 10, 2023

Related U.S. Application Data

(60) Provisional application No. 63/370,206, filed on Aug. 2, 2022, provisional application No. 63/287,886, filed on Dec. 9, 2021.

(51) Int. Cl.

*A63F 9/30* (2006.01)
*B25J 9/00* (2006.01)
(Continued)

(52) U.S. Cl.

CPC ............... *A63F 9/30* (2013.01); *B25J 9/0009* (2013.01); *B25J 11/0015* (2013.01);
(Continued)

(58) Field of Classification Search

CPC .... A63F 9/30; A63F 2250/52; G07F 17/3297; B25J 9/0009; B25J 11/0015; B25J 11/003; B25J 13/003; B25J 13/006; G06V 40/172

See application file for complete search history.

(56) References Cited

U.S. PATENT DOCUMENTS 5,368,310 A 11/1994 Ogata et al.
5,415,417 A * 5/1995 Reis, Jr. .................. G07F 17/32 273/447

(Continued)

FOREIGN PATENT DOCUMENTS

CN 202781159 U 3/2013
CN 212044744 U 12/2020

(Continued)

OTHER PUBLICATIONS

YouTube video entitled: "Robocatcher in Store," uploaded Apr. 26, 2009 by user "MTXYT". Retrieved from the Internet: <URL:https://www.youtube.com/watch?time_continue=64&v=1JGZIRoB7zM&feature=emb_title>.

(Continued)

*Primary Examiner* — Michael D Dennis
(74) *Attorney, Agent, or Firm* — McKee, Voorhees & Sease, PLC

(57) ABSTRACT

An arcade game includes a robot that can be controlled by a player to capture one or more items. The robot may include a stationary base, a lower member rotatably connected to the base to rotate about a first generally vertical axis, a torso member rotatably mounted to the lower member that rotates about a second axis that is generally horizontal; an arm member rotatably mounted to the torso member to rotate about a third axis that is generally parallel to the second axis. A hand portion may include hand-like pincers for grasping and releasing items and may include a sensor to sense contact with an item. A head portion may include a video screen that displays facial features. The head portion may include an image capturing device, such as a video camera.

11 Claims, 19 Drawing Sheets

(51) Int. Cl.

| | |
|---|---|
| ***B25J 11/00*** | (2006.01) |
| ***B25J 13/00*** | (2006.01) |
| ***G06V 40/16*** | (2022.01) |

(52) U.S. Cl.

CPC ........... *B25J 11/003* (2013.01); *B25J 13/003* (2013.01); *B25J 13/006* (2013.01); *G06V 40/172* (2022.01); *A63F 2250/52* (2013.01)

(56) References Cited

U.S. PATENT DOCUMENTS

| | | | | |
|---|---|---|---|---|
| 5,630,357 | A | 5/1997 | Akiyama | |
| 5,653,446 | A | 8/1997 | Lin | |
| 6,415,203 | B1 | 7/2002 | Inoue et al. | |
| 6,463,356 | B1 | 10/2002 | Hattori et al. | |
| 6,470,235 | B2 | 10/2002 | Kasuga et al. | |
| 9,202,171 | B2 | 12/2015 | Kuhn | |
| 11,623,339 | B1 * | 4/2023 | Dietz | B25J 9/0084 700/245 |
| 11,835,713 | B2 * | 12/2023 | Kamakura | B25J 19/021 |
| 2002/0038168 | A1 | 3/2002 | Kasuga et al. | |
| 2002/0181773 | A1 | 12/2002 | Higaki et al. | |
| 2006/0170164 | A1 * | 8/2006 | Watanabe | G07F 11/165 273/447 |
| 2007/0029734 | A1 | 2/2007 | Fukazawa et al. | |
| 2010/0099475 | A1 | 4/2010 | Soichi | |
| 2014/0120235 | A1 | 5/2014 | Jones et al. | |
| 2017/0092075 | A1 | 3/2017 | Usuki et al. | |
| 2017/0326443 | A1 | 11/2017 | Sato et al. | |
| 2018/0330566 | A1 | 11/2018 | Sakhno | |
| 2019/0213843 | A1 * | 7/2019 | Wang | G07F 17/3244 |

FOREIGN PATENT DOCUMENTS

| | | | |
|---|---|---|---|
| JP | 2007215943 | A | 8/2007 |
| JP | 2017060681 | A | 3/2017 |
| KR | 100496514 | B1 | 6/2005 |
| KR | 1020050115833 | A | 12/2005 |
| KR | 100796562 | B1 | 1/2008 |
| KR | 100912970 | B1 | 8/2009 |
| KR | 1020100031560 | A | 3/2010 |
| KR | 1020110096454 | A | 8/2011 |

OTHER PUBLICATIONS

YouTube video entitled: "Robo Catcher (with searchlight)," uploaded Feb. 26, 2007 by user "MTXYT". Retrieved from the Internet: <URL:https://www.youtube.com/watch?v=BzmpdZKaq8g>.
YouTube video entitled: "Ikebukuro Carrybot Catcher WIN," uploaded Feb. 20, 2016 by user "Jennifer93". Retrieved from the Internet: <URL:https://www.youtube.com/watch?v=Ci8w1t-J-8U>.
YouTube video entitled: "Robot Pokemon arcade game and Pokemon claw machines at NeoFuns arcade!," uploaded Sep. 29, 2016 by user "The Crane Couple". Retrieved from the Internet: <URL:https://www.youtube.com/watch?v=B_0IT1dK7c>.
YouTube video entitled: "Claw Pi Machine," uploaded Dec. 19, 2018 by user "Joseph Skovira". Retrieved from the Internet: <URL:https://www.youtube.com/watch?v=FLJaPmiJk4M&feature=emb_title>.
YouTube video entitled: "Robot Crane Game (Automatic)," uploaded May 7, 2008 by user "Aaron Alpert". Retrieved from the Internet: <URL:https://www.youtube.com/watch?v=yWa_t6VKEDo>.
Minze Mo et al., "The Claw Pi Machine, Project" [online], 2018 [retrieved on Mar. 16, 2023]. Retrieved from the Internet: >URL:https://courses.ece.cornell.edu/ece5990/ECE5725_Fall2018_Projects/Wednesday_mm2943_rp625_wc585/mm2943_rp625_wc585.html>, 38 pages.
Lin et al. "An interactive finger-gaming robot with real-time emotion feedback." 2015 6th International Conference on Automation, Robotics and Applications (ICARA). IEEE (2015): 513-518.
Partial Supplementary European Search Report in EP22905420.0, mailed Dec. 15, 2025, 18 pages.

* cited by examiner

PRIZE ACQUISITION ARCADE GAME WITH ROBOT

CROSS REFERENCE TO RELATED APPLICATIONS

This application claims priority under 35 U.S.C. § 119(e) to provisional patent applications U.S. Ser. No. 63/287,886, filed Dec. 9, 2021, and U.S. Ser. No. 63/370,206, filed Aug. 2, 2022. The provisional patent applications are hereby incorporated by reference in their entireties, including without limitation, the specifications, claims, and any figures, tables, appendices, or drawings thereof.

TECHNICAL FIELD

The invention relates generally to arcade games. More specifically, the invention relates to an arcade game wherein an object of the game is for a player to capture an object.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Crane-style arcade games have an electronic control system and a mechanical system that allows a player to purchase a chance to win a prize by skillful manipulation of player controls. The controls typically include a joystick and/or buttons. These controls allow the player to move a crane head in front/back and left/right directions above a supply of prizes and then drop a claw which will pick up prize merchandise if skillfully and properly manipulated. United States Patent Application No. 2010/0099475 with a named inventor Soichi shows a similar game wherein the crane mechanism is replaced by a humanoid bipedal walking robot. However, the control of the robot by a player is rudimentary, and the robot lacks any significant interaction with the player. The game playing experience can be improved by providing better and more interactive control of the robot as well as meaningful interaction between the robot and the player and improved functionality of the robot.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of the present disclosure to provide an arcade game that permits a player to capture prizes within the arcade game by controlling a robot.

According to one embodiment, the present disclosure relates to an arcade game that includes a cabinet containing a plurality of items; and a robot within the cabinet, wherein the robot is adapted to be controlled by a player to capture one or more of the items. The robot may include a stationary base; a lower member rotatably connected to the base to rotate about a first generally vertical axis; a torso member rotatably mounted to the lower member that rotates about a second axis that is generally horizontal; an arm member rotatably mounted to the torso member to rotate about a third axis that is generally parallel to the second axis; the arm member having a first member that is mounted to the torso member and a second member that is axially aligned with the first member and located distally away from the torso member; the first and second members of the arm member being swivelly mounted to each other to rotate about a fourth axis that is generally axially aligned with the first and second members of the arm member; and a hand portion rotatably mounted at a distal end of the second member of the arm member to rotate about a fifth axis that is generally transverse to the fourth axis. The hand portion may include hand-like pincers for grasping and releasing items. The robot may include a head portion mounted to the second member of the arm member. The head portion may include a video screen that displays facial features. The head portion may include an image capturing device, such as a video camera. The game may also include a computer media in connection with the image capturing device that permits facial recognition of returning players. The cabinet may have the shape of a hexagonal prism that permits viewing of game play from all angles around the cabinet.

According to another embodiment, the disclosure describes an articulated robotic arm on a rotating lower member adapted to capture prizes in an arcade game that includes a video screen mounted on one of the proximal arm members having the appearance of a head and animated face.

According to another embodiment, an articulated robotic arm has a base, a first arm member that is mounted to rotate around a vertical axis on the base, a second arm member that is hinged to the first arm member to rotate about a horizontal axis, and a third arm member hinged to the second arm member to rotate about a second horizontal axis; a claw adapted to acquire prizes attached to the third arm member; and a video screen mounted to the top of the third arm member having the appearance of a head and animated face. The third arm member may include a proximal portion connected to the second arm member and a distal portion connected to the claw; wherein the proximal portion and the distal portion swivel relative to each other and wherein the video screen is mounted on the proximal portion.

According to another embodiment, an articulated robotic arm in a prize capture arcade game is programmed to move in a manner that simulates a dance either as an initial interest mechanism or as a celebration upon successfully capturing a prize.

According to another embodiment the disclosure relates to an articulated robotic arm having a base, a first arm member that is mounted to rotate around a vertical axis on the base, a second arm member that is hinged to the first arm member to rotate about a horizontal axis, and a third arm member hinged to the second arm member to rotate about a second horizontal axis; a claw adapted to acquire prizes attached to the third arm member; wherein the arm members are adapted such that the first arm member rotates about the base, while the second arm member rotates relative to the first arm member, and the third arm member rotates relative to the second arm member in a rhythmic manner to simulate a dance. The claw may have the appearance of hands and may be adapted to simulate clapping during the dance.

According to another embodiment, the present invention relates to an arcade game that has a cabinet containing items to be captured; a robot comprising: a stationary base, a foot portion mounted to rotate about a vertical axis on the base, a lower body portion mounted to the foot portion to rotate about a first horizontal axis between the lower body portion and the foot portion, an upper body portion having a proximal portion and a distal portion, the proximal portion of the upper body portion mounted to the lower body portion to rotate about a second horizontal axis between the lower body portion and the upper body portion; and a capturing mechanism mounted at the distal portion of the upper body portion, the capturing mechanism adapted to capture and release at least one of items to be captured. A control mechanism permits a user to at least partially control a position of the capturing mechanism above the items to be captured by controlling an angle of rotation of the foot portion about the vertical axis relative to the stationary base and by controlling a distance of the capturing mechanism away from the vertical axis. The distance of the capturing mechanism away from the vertical axis may be controlled by rotation of the lower body portion about the first horizontal axis and rotation of the upper body portion about the second horizontal axis. The robot may include a video display adapted to display facial features attached to the upper body portion. The control mechanism may be mounted to an exterior of the cabinet. The control mechanism may be a portable user device programmed with an app that communicates with the robot via a wireless protocol. The capturing mechanism may be a grabber mechanism adapted to grab the items. The grabber mechanism may have two hand portions that are selectively moved towards each other to capture an item and selectively moved away from each other to release the captured item. The hand portions may comprise a removable pad. The shape of the removable pad may be adapted to be suitable for the items. A coefficient of friction of the removable pad may affect how difficult it is to capture and retain an item. The force with which the hand portions move towards each other may be adjustable to control a difficulty in capturing and retaining an item. The items may include redemption items that can be redeemed for a prize or prizes. The items may include ticket rolls. The items may be prizes. The items may be include plush prizes. The game may also include a swivel axis between the distal and proximal portions of the upper body portion that permits the distal portion to swivel relative to the proximal portion. The game may further comprise a video display adapted to display facial features attached to the distal portion of the upper body portion. The arcade game may include an optical sensor for sensing the presence of a potential player. The robot may be adapted to move the video display to face the potential player after sensing the presence of the potential player. The robot may include a speaker that is programmed to play a message that simulates the robot talking to the potential player. The arcade game may further comprise an arm portion pivotally connected to the distal end of the upper body portion, the arm portion connecting the upper body portion to the capturing mechanism. The robot may be programmed to move in a manner that simulates a dance either as an initial interest mechanism or as a celebration upon successfully capturing a prize. The capturing mechanism may include simulated hands, wherein the hands simulate clapping during the dance. The control mechanism may have a joystick and a push button, and the angle of rotation of the foot portion about the vertical axis relative to the stationary base may be controlled by moving the joystick to the left or right and the distance of the capturing mechanism away from the vertical axis may be controlled by moving the joystick fore and aft; and pushing the push button may cause the capturing mechanism to move towards the items and attempt to capture an item. The joystick may have an ergonomic ball with a recessed handprint. The grabbing mechanism may include a sensor for sensing the proximity of items to the grabbing mechanism. The cabinet may have a hexagonal playing field surrounded by six generally transparent panels. Optical sensors may be provided associated with each panel to sense the presence of a potential player. The robot may be adapted to move the video display to face the potential player after sensing the presence of the potential player. The robot may have a starting position wherein the robot will rotate approximately 180 degrees clockwise and 180 degrees counterclockwise around the vertical axis. The lower body portion may rotate approximately 40 degrees rearward on the first horizontal axis from a vertical orientation and approximately 50 degrees forward on the first horizontal axis from the vertical orientation.

According to another feature, a remote user can control the robot including speaking to a player or potential player so that the robot responds to the player or potential player in real time.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Attached hereto as an Appendix is a User's Manual for an arcade game with a prize acquiring robot according to one embodiment of the invention.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless specifically indicated.

This disclosure relates to an arcade game 10 that includes a robot 12 within a cabinet 20 that is used to capture and release prizes (see e.g. FIGS. 12A-E). The robot 12 may be essentially an articulated robotic arm mounted on a rotating base. A player uses controls to manipulate the robot 10 to attempt to grasp (capture) a prize from a playing field in the cabinet. The robot 12 may be programmed to interact with and attract players.

Figure 1:
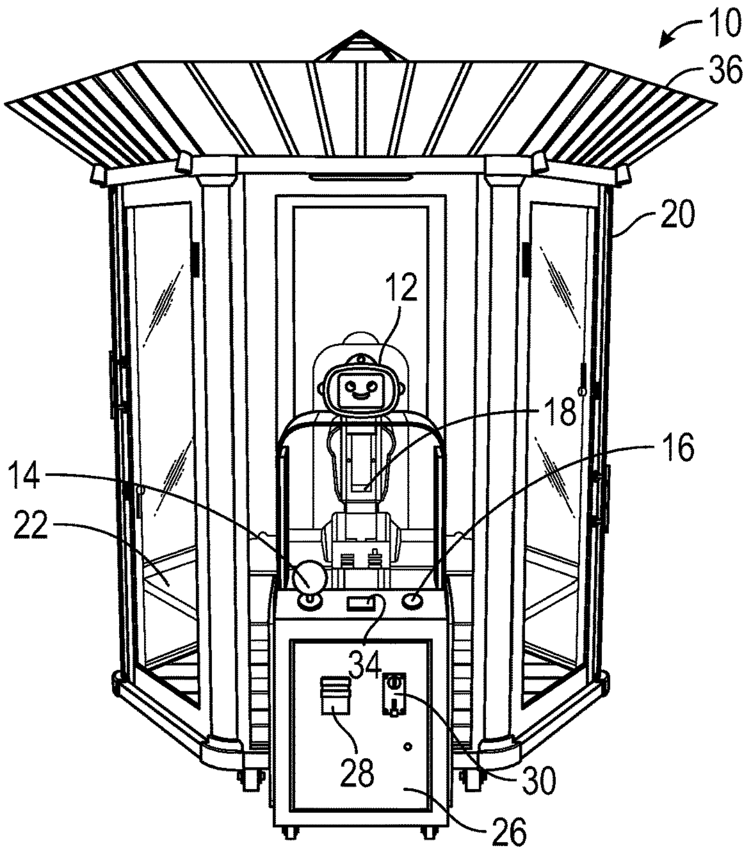
FIG. 1 is a front perspective view of an arcade game with a robot.
Figure 2:
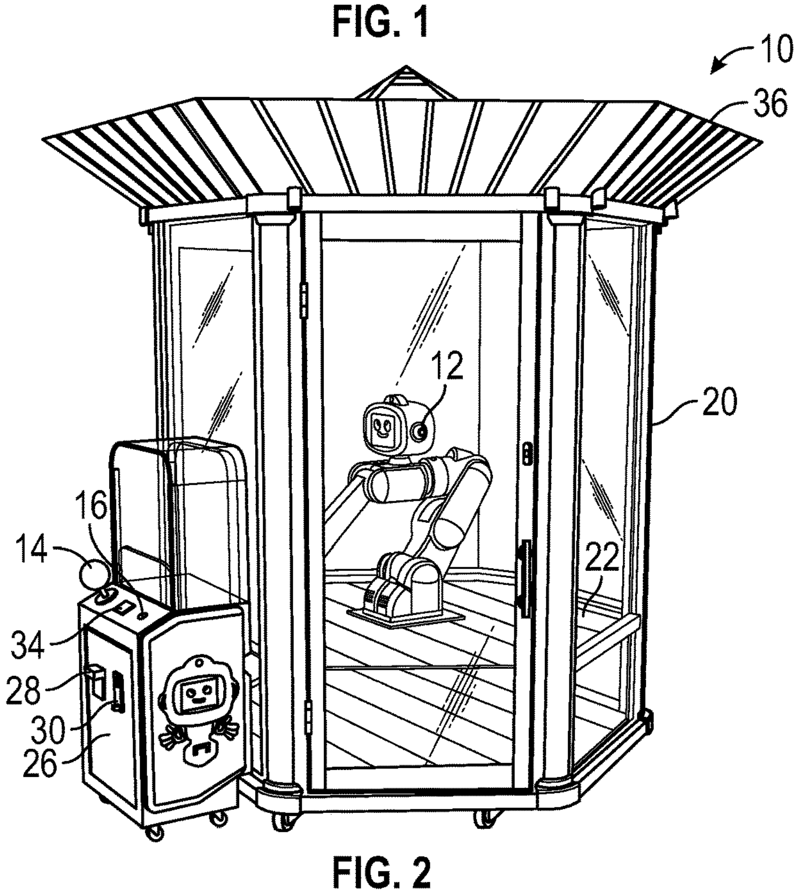
FIG. 2 is a side perspective view of the arcade game of FIG. 1.

As seen in FIGS. 1 and 2 the arcade game 10 includes a cabinet 20 that includes within it a prize-acquiring robot 12. A prize supporting structure 22 for supporting a variety of items (prizes) 24 (not shown in FIGS. 1 and 2, see FIGS. 12A-E) that can be captured by the robot 10. The cabinet 20 can take a variety of shapes and appearances but should permit players to see the robot 12 and the items 24 on the prize supporting structure 22. A control console 26 is provided on the front of the game 10. The control console 26 may include a joystick 14 and button 16 that can used by a player to control the robot 12. Pressing button 16 causes the grasping portion (claw) 18 to drop down and close, hopefully capturing a prize. In a preferred embodiment the joystick 14 is generally spherical in shape with an indentation ergonomically shaped to match a player's hand (see FIG. 18). The control console 26 may also include a card reader 28 or other mechanism for receiving payment or credits from a player. The console 26 may also include a ticket dispenser 30 for providing tickets to a player. A prize door 32 may also be provided in the console 26 to permit a player to access any prizes the player has successfully captured with the robot 12. A small display screen 34 may also be provided on the console 26 to provide information to players and users that set up the machine.

Figure 3:
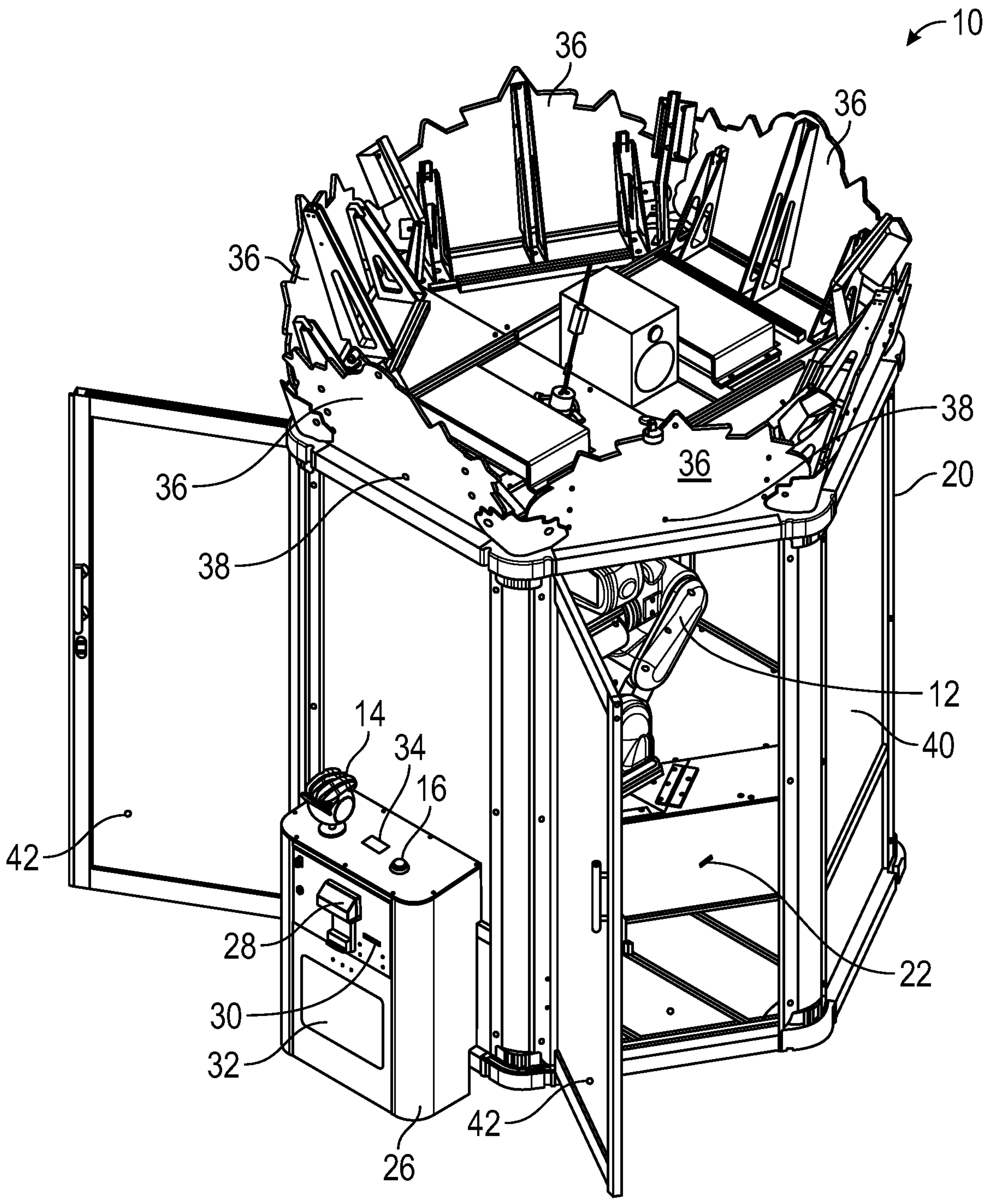
FIG. 3 a perspective view of an arcade game with a robot with side doors opened to permit access to the robot and prize area.

As seen in FIG. 3, a series of decorative marquees 36 may be provided around the top of the cabinet 20 to give the game 10 an attractive appearance and to hide structures on the roof of the cabinet 20. The marquees 36 preferably will be provided with lights, including LED lights, that can be programmed to illuminate in different patterns and colors depending on game conditions. Each marquee 36 may include a sensor 38 for sensing when a person is near the game 10 in in alignment with the marquee 36 so that the game 10 senses where potential players are located in order to cause the robot 12 to face the potential player.

As further seen in FIG. 3 the cabinet 20 may be a hexagonal prism that permits viewing of the robot 12 from 360 degrees. The panels 40 of the cabinet 20 may comprise transparent glass to facilitate view of the robot 12 and playing field. At least one, and preferably two of the panels 40 should be doors 42 that can be opened to provide access to the robot 12 and playing field as shown in FIG. 3. Sensors (not shown) may be provided to sense when the doors 42 are opened.

Figure 4:
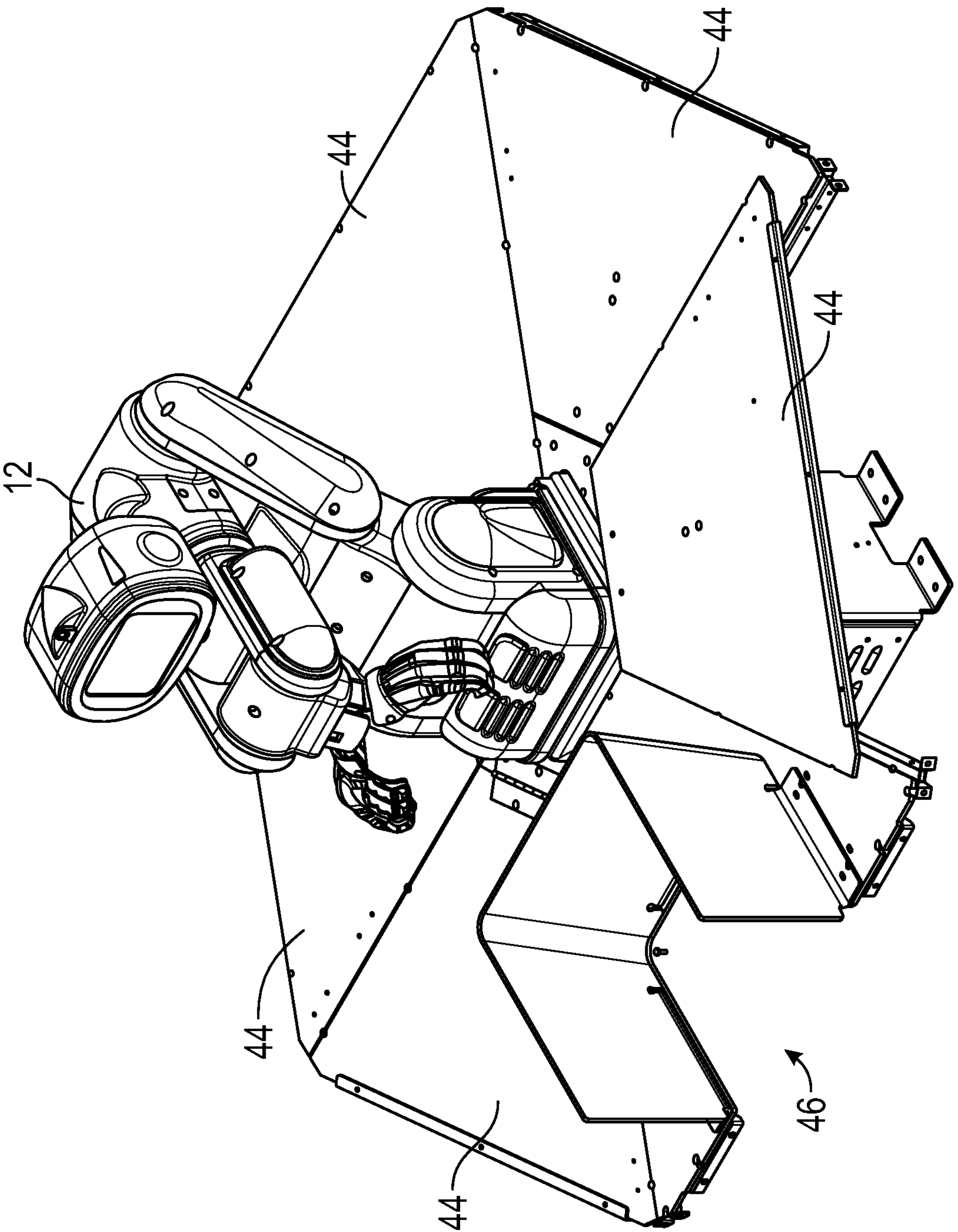
FIG. 4 is a detail view of a robot and prize supporting structure of the arcade game of FIG. 3.

FIG. 4 shows a robot 12 according to one embodiment in position surrounded by floor panels 44 that form the prize supporting structure 22 or playing field on which items are supported for the robot 12 to attempt to capture. The prize supporting structure 22 includes a prize opening 46 through which a player attempts to drop any items that have been successfully captured by the robot 12. The floor panels 44 should have sufficient structural rigidity to support whatever items are being used in the game. The floor panels in some embodiments may be reflective or may be transparent or translucent to permit illumination from below.

Figure 5:
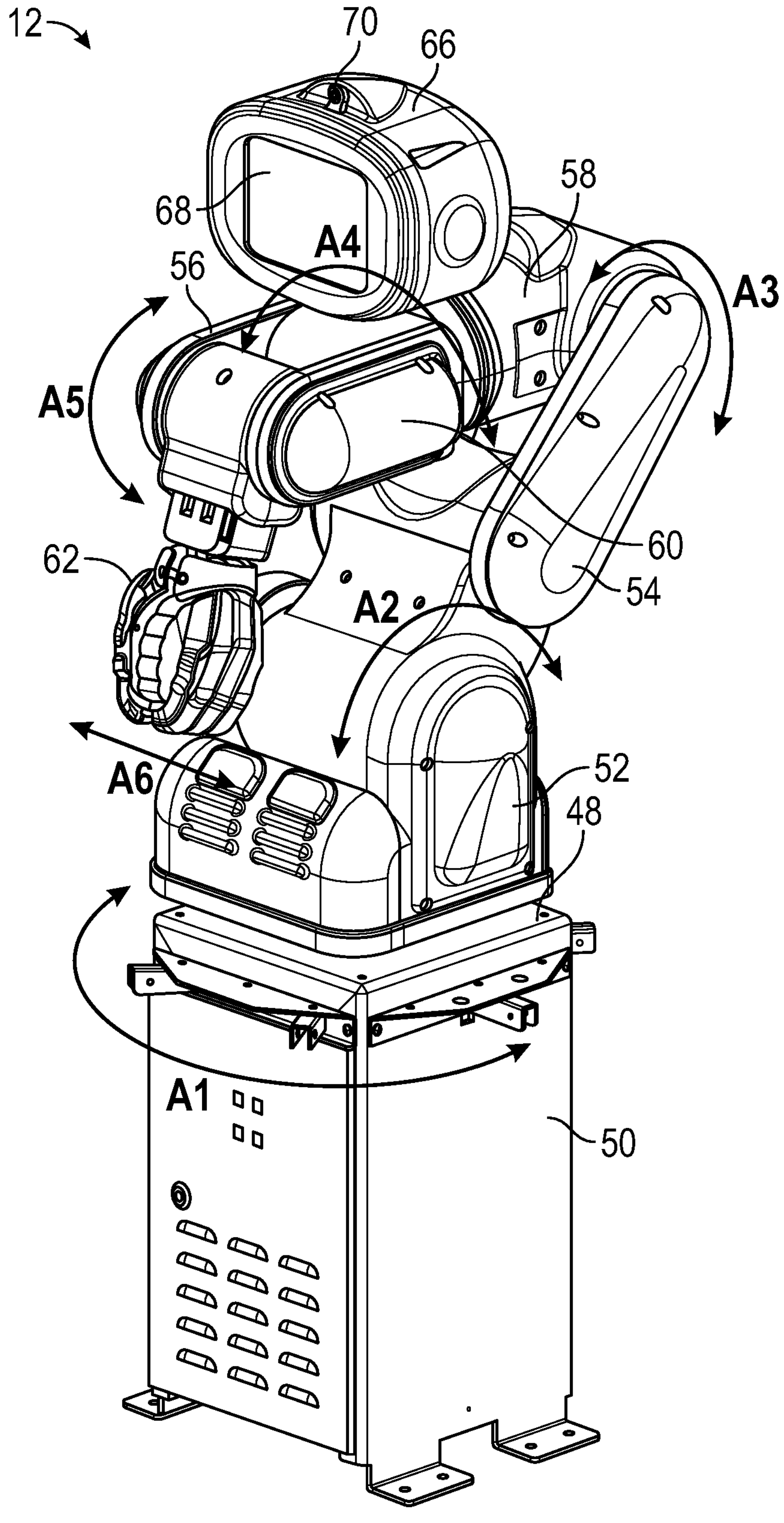
FIG. 5 is a detail view of a robot illustrating the axes around which the robot can pivot.
Figure 6:
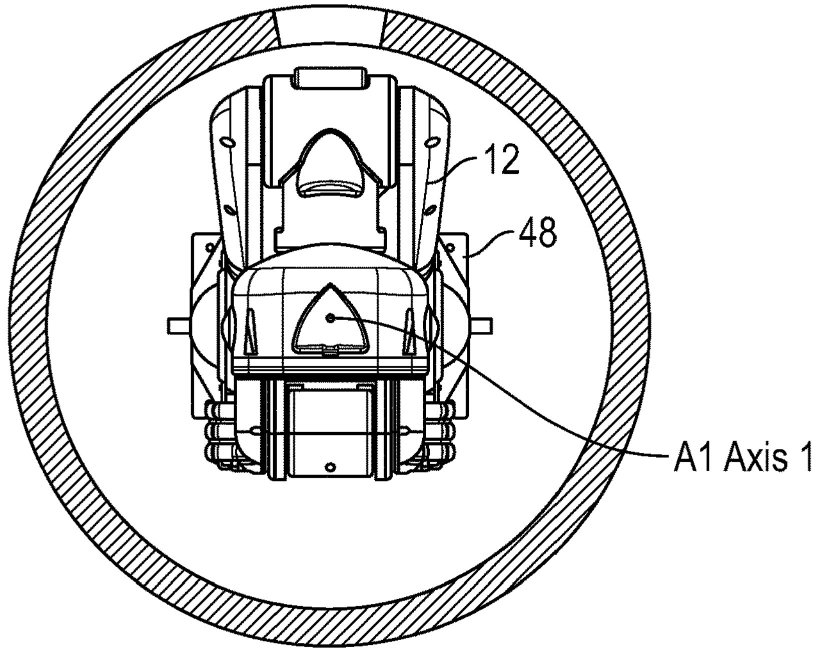
FIG. 6 is a top plan view illustrating rotation about Axis 1 of FIG. 5.
Figure 7:
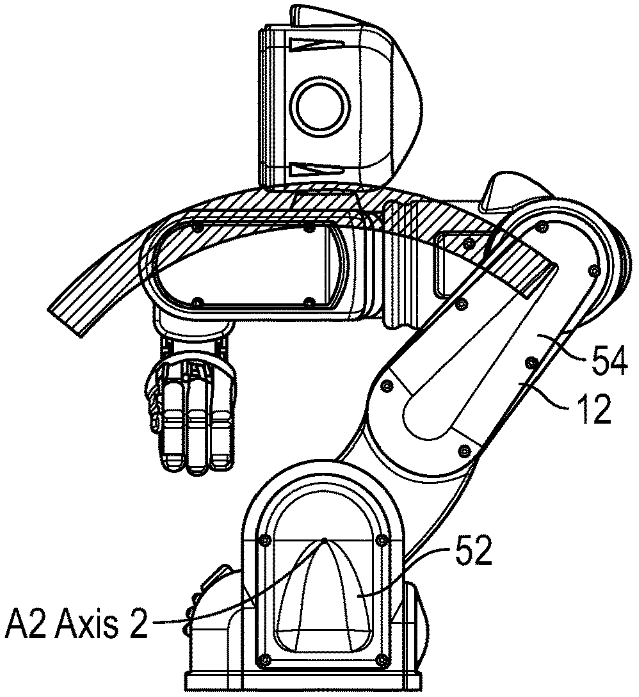
FIG. 7 is a side elevation view illustrating rotation about Axis 2 of FIG. 5.
Figure 8:
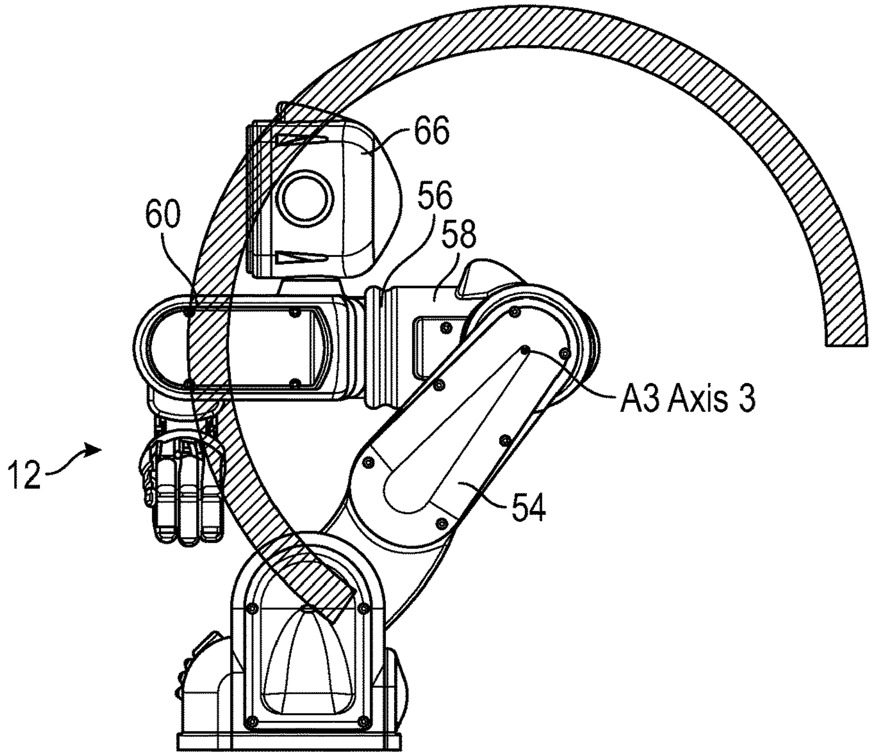
FIG. 8 is a side elevation view illustrating rotation about Axis 3 of FIG. 5.
Figure 9:
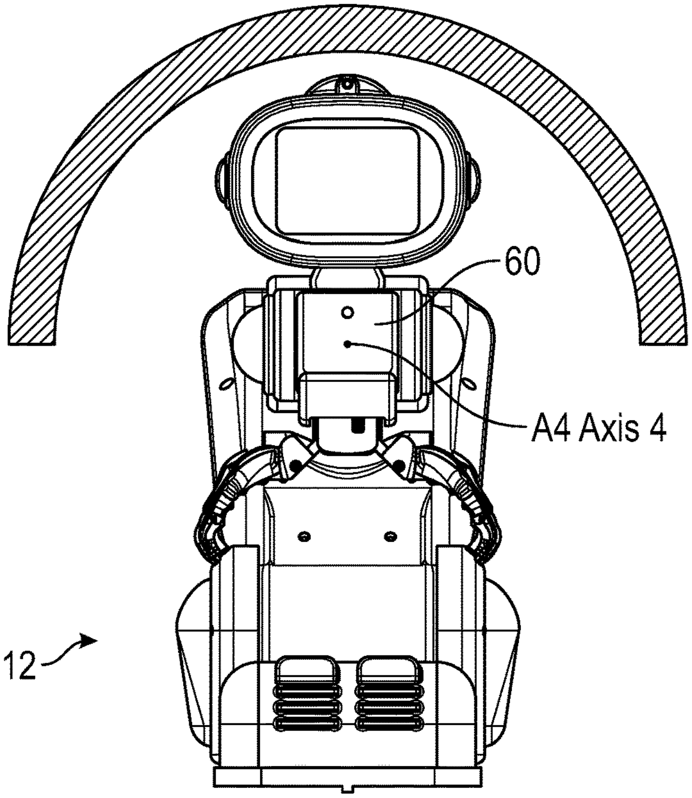
FIG. 9 is a front elevation view illustrating rotation about Axis 4 of FIG. 5.
Figure 10:
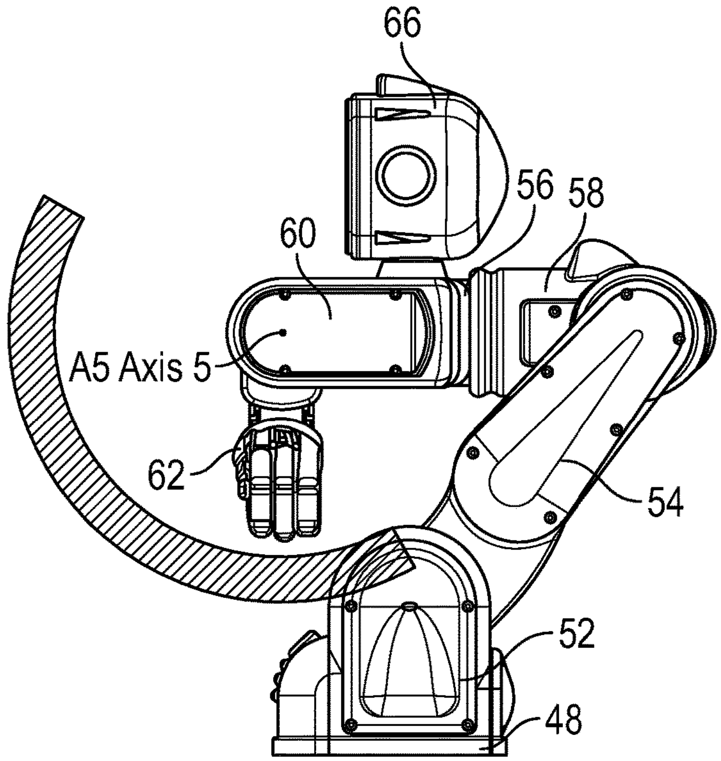
FIG. 10 is a side elevation view illustrating rotation about Axis 5 of FIG. 5.

Details regarding the structure and function of one embodiment of the robot 12 are illustrated in FIG. 5. The robot 12 may include a stationary base 48 that sits on a support cabinet 50. A lower member 52, that may have the general appearance of feet, is rotatably connected to the base 48 to rotate about a first generally vertical axis A1. A torso member 54 is rotatably mounted to the lower member 52 and rotates about a second axis A2 that is generally horizontal. An arm member 56 is rotatably mounted to the torso member 54 to rotate about a third axis A3 that is generally parallel to the second axis A2. The arm member 56 may include a first arm member 58 that is mounted to the torso member 54 and a second arm member 60 that is axially aligned with the first arm member 58 and located distally away from the torso member 54. The first and second arm members 58, 60 may be swivelly mounted to each other to rotate about a fourth axis A4 that is generally axially aligned with the first and second arm members. A hand portion 62, that forms the grabbing mechanism 18 or claw, is rotatably mounted at a distal end of the second arm member 60 to rotate about a fifth axis A5 that is generally transverse to the fourth axis A4. The hand portion 62 may include hand-like pincers 64 for grasping and releasing items. According to one embodiment, the pincers 64 are adapted to have the appearance of human hands. The pincers rotate about a six axis A6 A head portion 66 may be mounted to the second arm member 60. The head portion 66 may include a video screen 68 that displays facial features. The head portion 66 may include an image capturing device 70, such as a video camera or the like.

Figure 11:
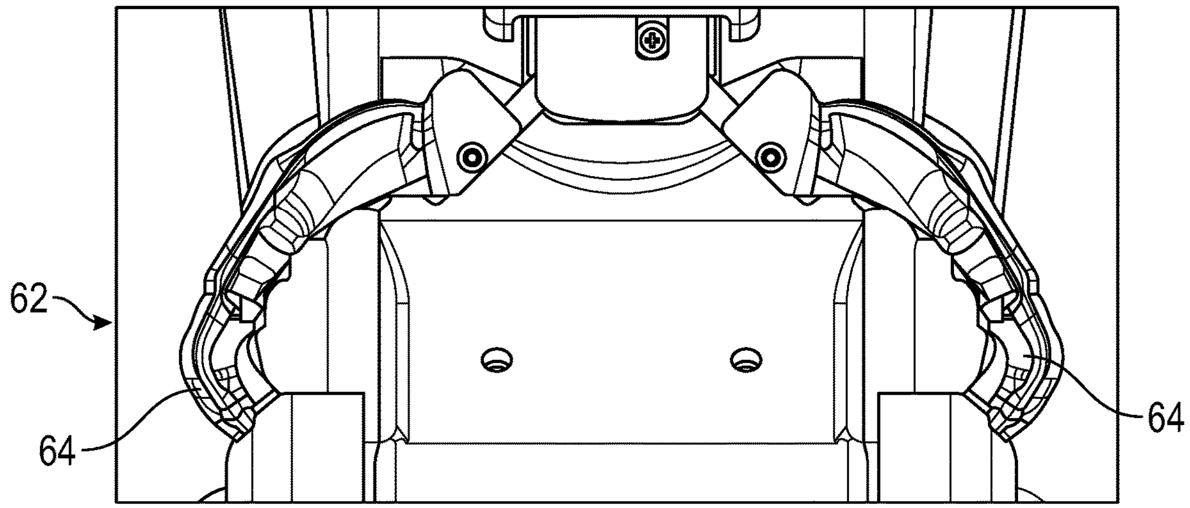
FIG. 11 is a detail view of the claw of FIG. 5 illustrating rotation of the claw portions about Axis 6 of FIG. 5.

The range of rotation about the various axes according to one embodiment is shown in FIGS. 6-11. The robot 12 will rotate about 340 degrees around axis 1 A1; the torso member 54 will rotate forward and aft about 90 degrees total around A2, 50 degrees forward and 40 degrees aft. The arm member 56 can rotate 235 degrees relative to the torso member 54 about axis 3 A3. The second arm member 60 will swivel 180 degrees relative to the first arm member 58 about axis 4 A4. The hand portion 62 can rotate 150 degrees relative to the arm member 56 around axis 5 A5, 30 degrees above alignment with the arm member 56 and 120 degrees below alignment. Finally, as seen in FIG. 11, the pincers 64 have a 120 degrees of rotation relative to each other about A6.

The robot 12 may be programmed to dance and clap as the game plays music in order to attract players or to celebrate when a player has a successful turn. The movement of the robot's portions can be timed to coordinate with the music. The video screen 68 can simulate facial expressions and may include a depiction of a mouth 72 that moves to simulate talking. The image capturing device 70 may be associated with a computer memory (not shown) that includes facial recognition features to recognize returning players.

Figure 12A:
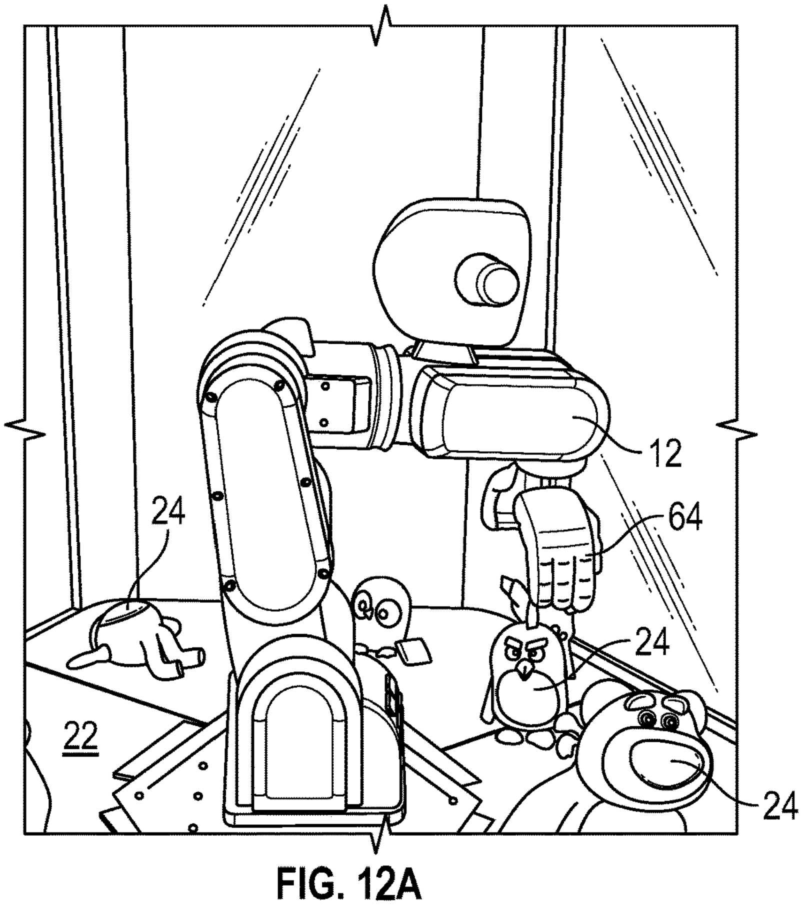
FIG. 12A shows a robot being positioned with the claw above a prize.
Figure 12B:
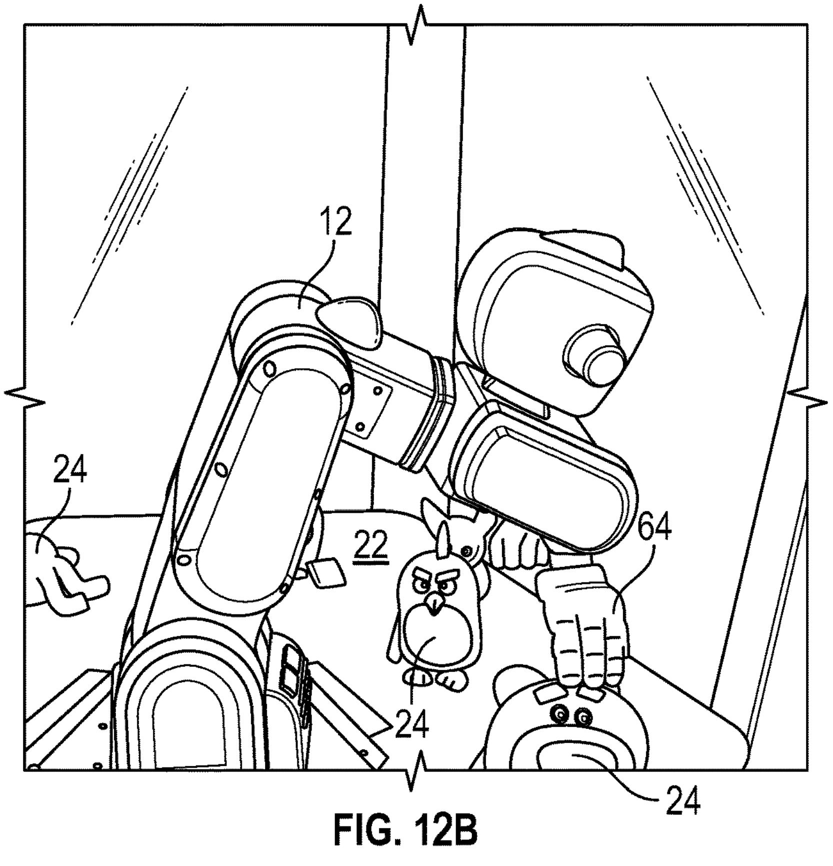
FIG. 12B shows the robot of FIG. 13A being lowered toward the prize.
Figure 12C:
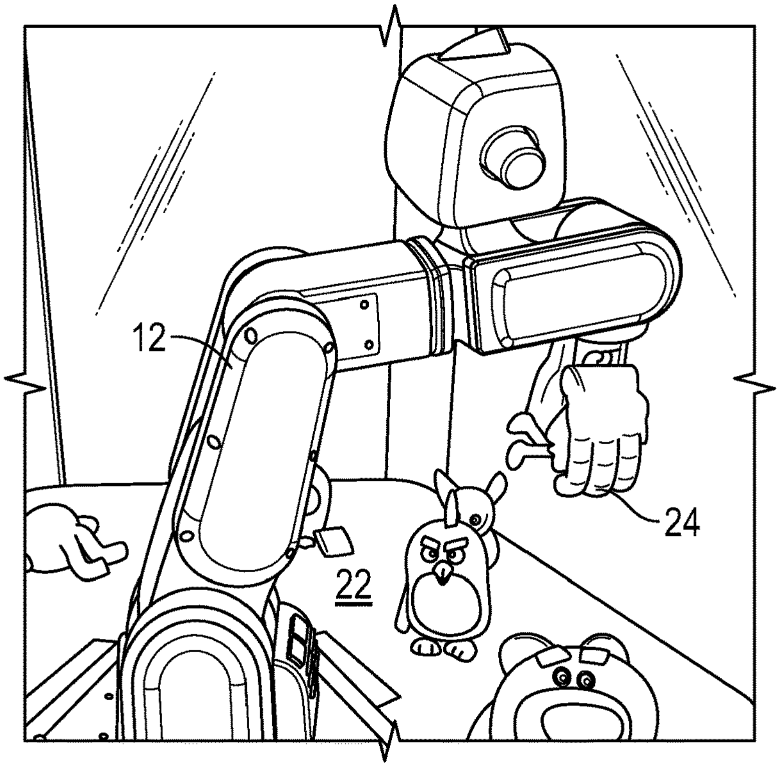
FIG. 12C shows the robot of FIG. 13B after it has captured the prize within the claw.
Figure 12D:
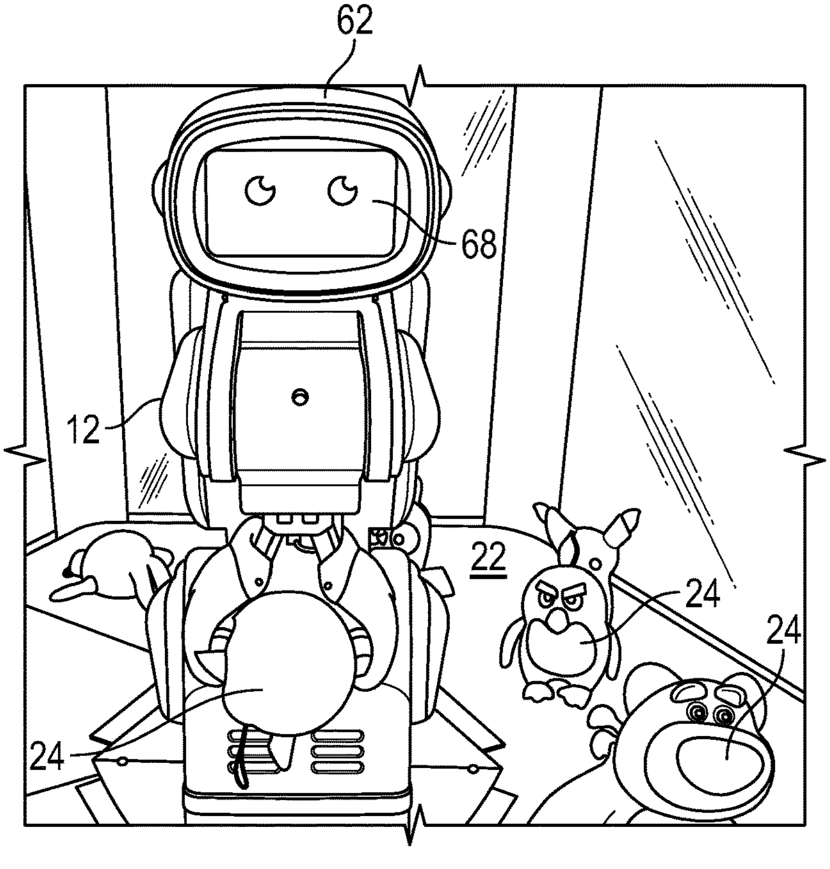
FIG. 12D shows the robot of FIG. 13C rotated to move the prize towards a prize opening.
Figure 12E:
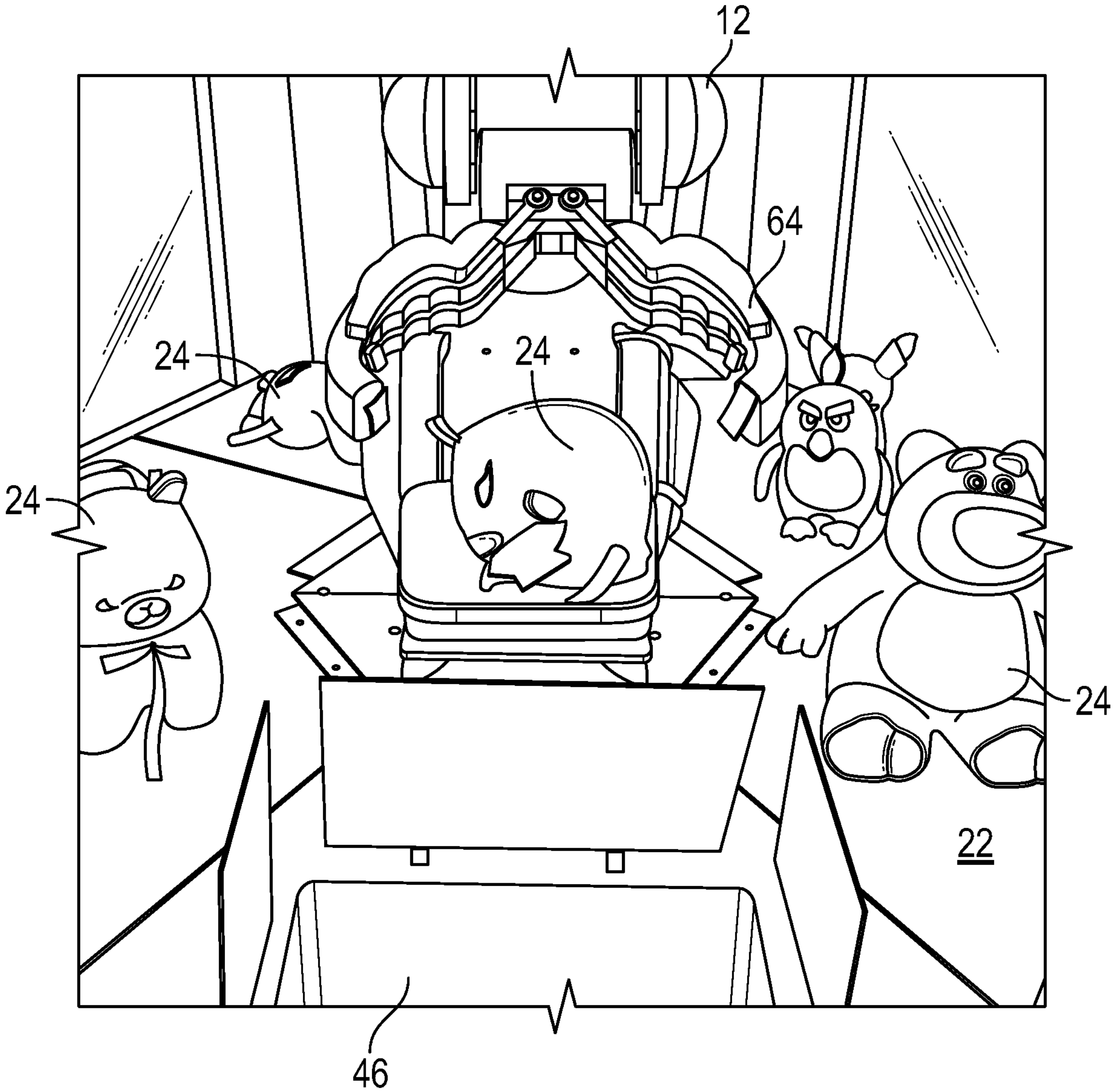
FIG. 12E shows the robot of FIG. 13D dropping the prize into the prize opening.

The use of the robot 12 to capture a prize 24 is shown in FIGS. 12A-E. A player manipulates the joystick 14 to control the position of the robot 12. According to one embodiment, left and right movement of the joystick 14 causes rotation of the robot 12 about axis 1 A1 (e.g., left movement causes clockwise rotation and right movement causes counterclockwise motion), and forward and rearward movement of the joystick causes forward and rearward bending of the robot 12. The robot 12 is programmed to translate the forward and rearward signals to cause rotation of the relevant portions about axes A2, A3, and A5 to accomplish the forward and rearward bending of the robot to position the grasping portion 18 above a desired prize 24. Once above a prize 24, a player pushes the button 16 on the console 26 and the robot will automatically drop the grasping mechanism towards the prize supporting structure 22 and cause the pincers 64 to close towards each other to attempt to grab the prize 24. The robot 12 may be programmed to then rotate to a forward position as shown in FIG. 12D with the grasping portion 18 aligned over the prize opening 46. The robot 12 will then open the pincers 64 and drop any captured prize 24 into the prize opening.

Figure 13A:
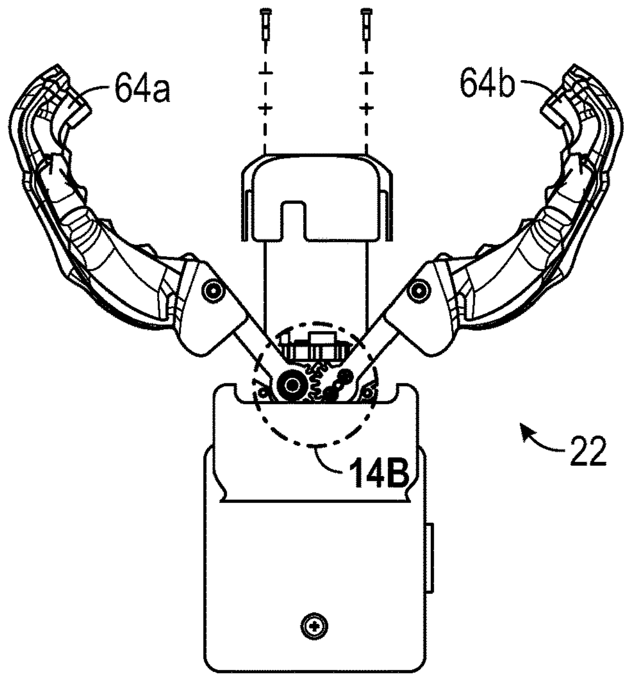
FIG. 13A is a partially exploded view of a claw with a cover removed.
Figure 13B:
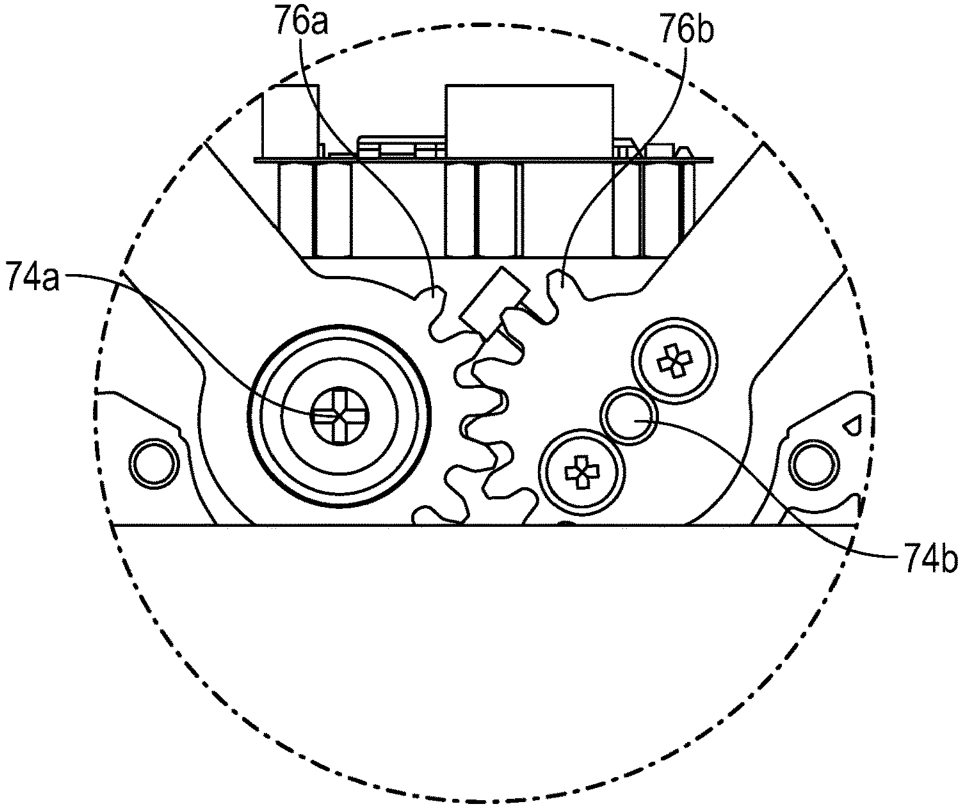
FIG. 13B is a detail view of a portion of FIG. 14A.
Figure 14A:
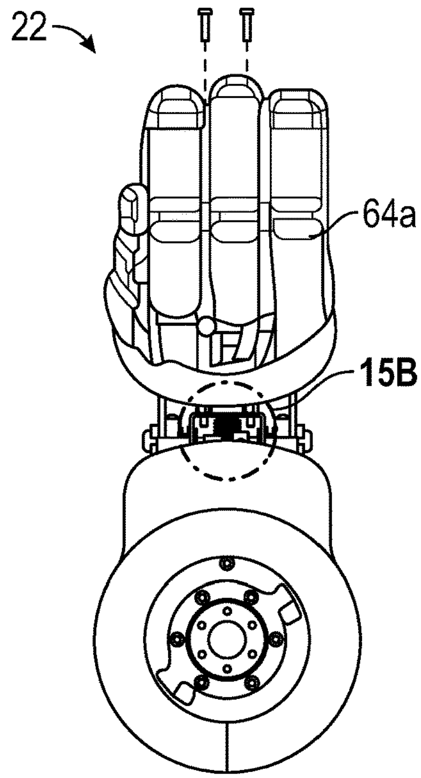
FIG. 14A is a side view of the claw of FIG. 14A.
Figure 14B:
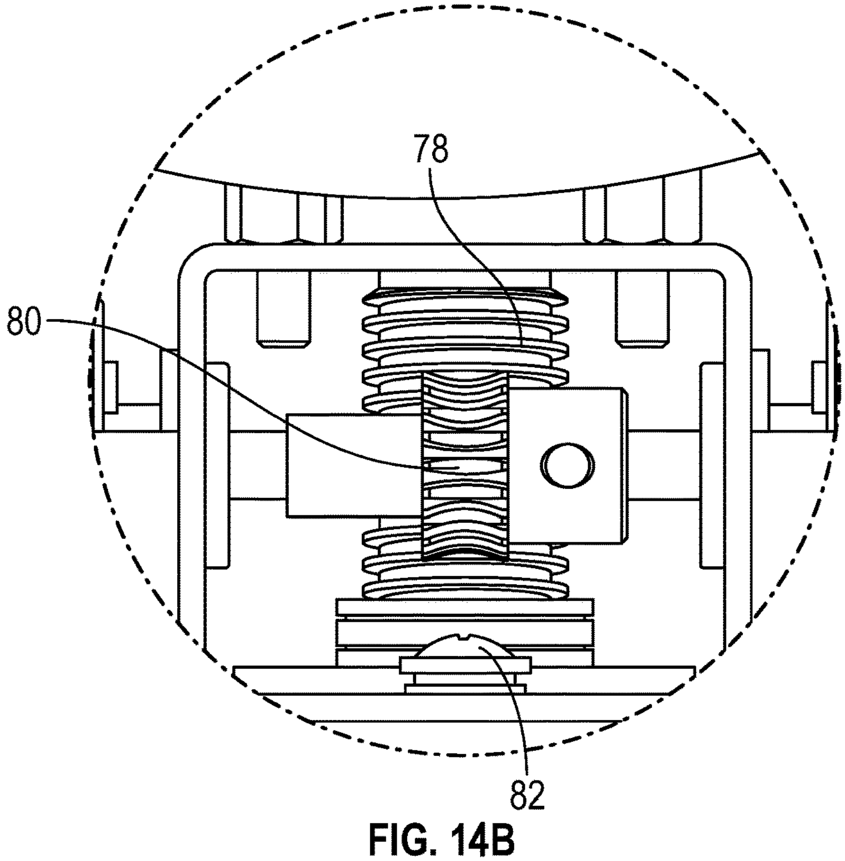
FIG. 14B is a detail view of a portion of FIG. 15A.

Additional details of the grasping mechanism 18 can be seen in FIGS. 13A and 13B. Each of the pincers 64*a,b* is mounted to rotate about a separate mounting pin 74*a, b*. A first pincer 64*a* is mounted to a drive (not shown) that causes rotation of the first pincer 64*a* about its mounting pin 74*a*. Each of the pincers 64*a,b* has a gear 76*a,b* formed at its proximal end. Gears 76*a* and 76*b* mesh with each other such that rotation of the first pincer 64*a* causes corresponding rotation of the second pincer 64*b*. FIGS. 14A and 14B show the grasping mechanism 18 of FIG. 13A from a side view. As seen in FIG. 14B, a worm gear 78 engages and axle 80 that acts to provide the rotational force to pincer 64*a*. As also seen in FIG. 14B, a pressure sensor 82 senses the pressure that is applied to the grasping mechanism 18 when it contacts a structure such as a prize 24 or the prize supporting structure 22. When a set pressure is met or exceeded, the robot is programmed to stop or even slightly reverse the direction of the grasping portion 18 in order to avoid damage to the grasping portion 18 and or the prize 24 or prize supporting structure 22.

Figure 15:
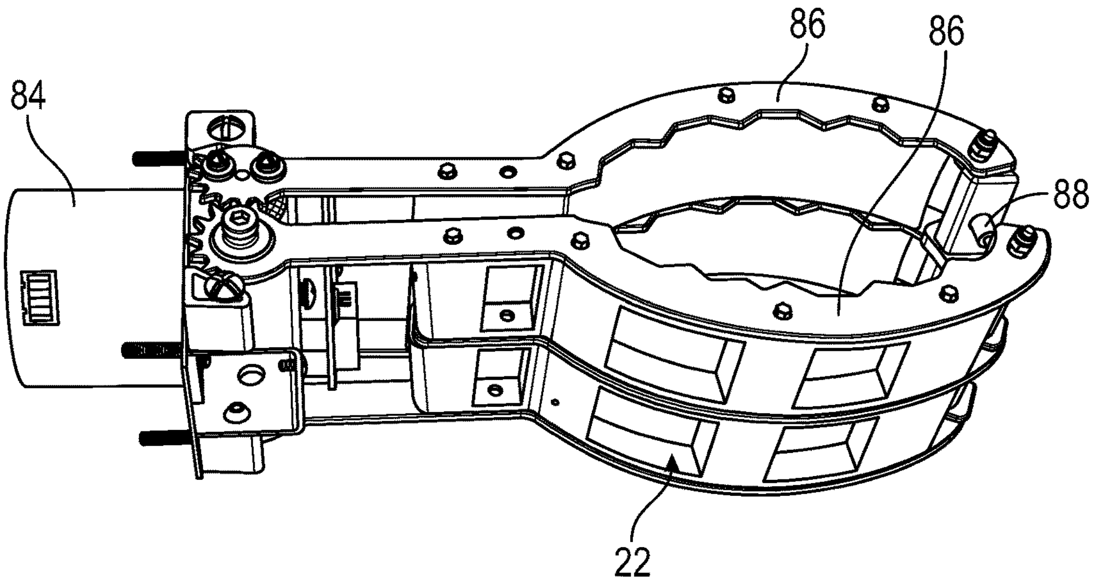
FIG. 15 is a detail view of claw with the covers removed.
Figure 16:
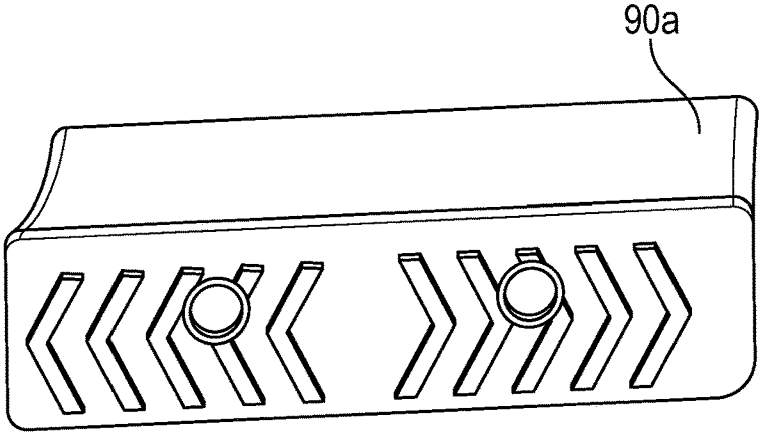
FIG. 16 is a perspective view of a pad for attachment to a claw the is suitable for use in capturing smaller items.
Figure 17:
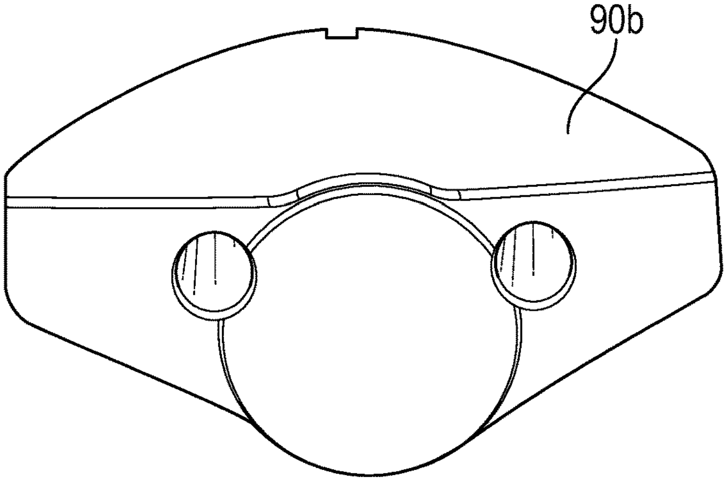
FIG. 17 is perspective view of a pad for attachment to a claw that is suitable for use in capturing plush items.

FIG. 15 illustrates the internal structure of one embodiment of the grasping structure 22. A drive unit 84 provides the power to rotate the worm gear 78 that is shown in FIG. 14B. The frame 86 of the pincers 64 is adapted to have handlike portions attached, to simulate the appearance of the robot 12 having hands. Additionally, the ends of the pincers 64 have mounting hardware that permits adding removable pads 90 that can affect how easy or difficult it is to grasp items. The shape and coefficient of friction of the pads can be varied depending upon the items available in the game and how difficult it is desired to make capturing an item. For example, FIG. 16 is a perspective view of a pad 90*a* that is suitable for use in capturing smaller items. FIG. 17 is perspective view of a pad 90*b* for attachment to a claw that is suitable for use in capturing plush items. The with which the pincers 64*a,b* move towards each other is adjustable to control a difficulty in capturing and retaining an item.

Figure 18:
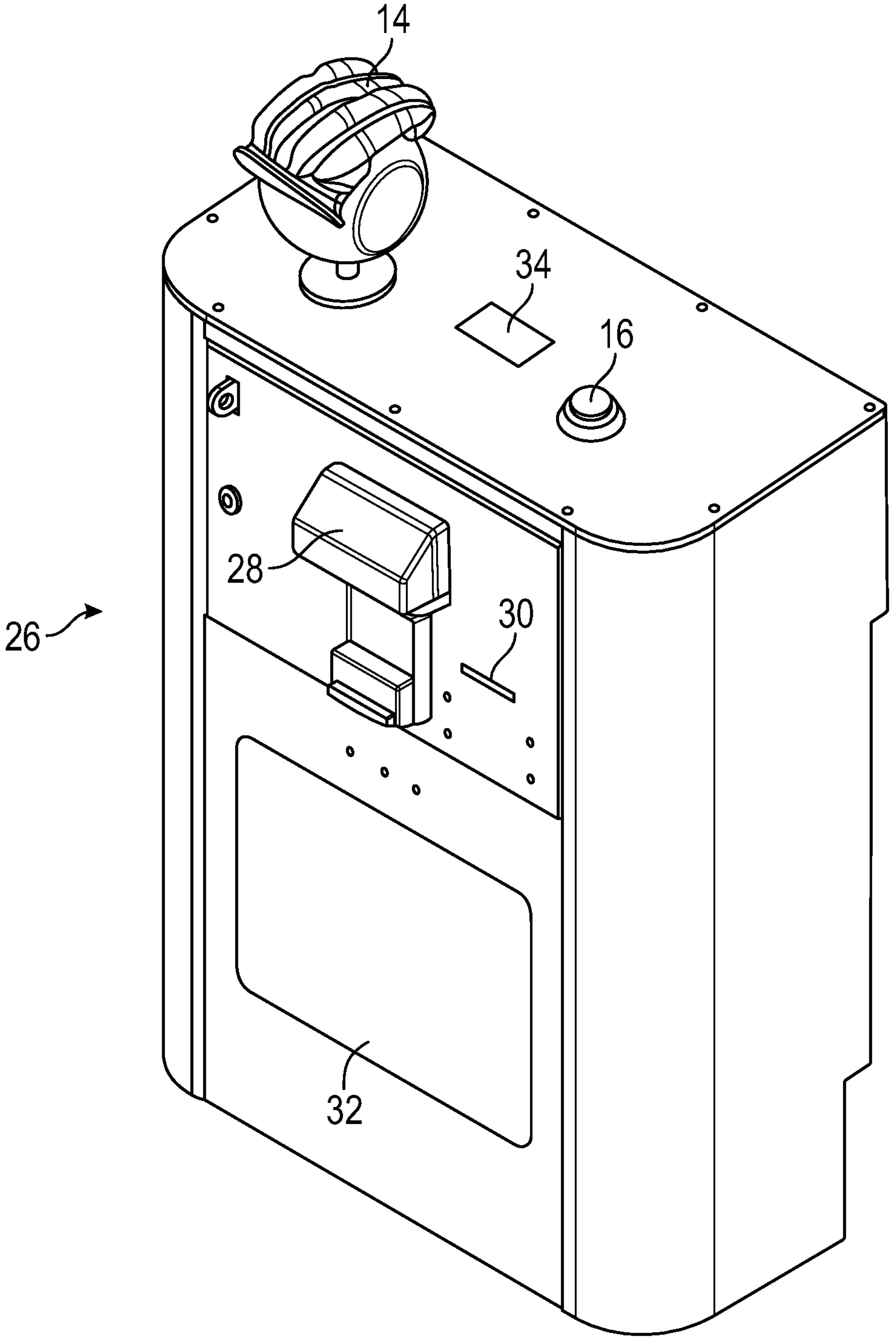
FIG. 18 is a perspective view of a control unit for use in operating and playing an arcade game with a prize capturing robot.
Figure 19:
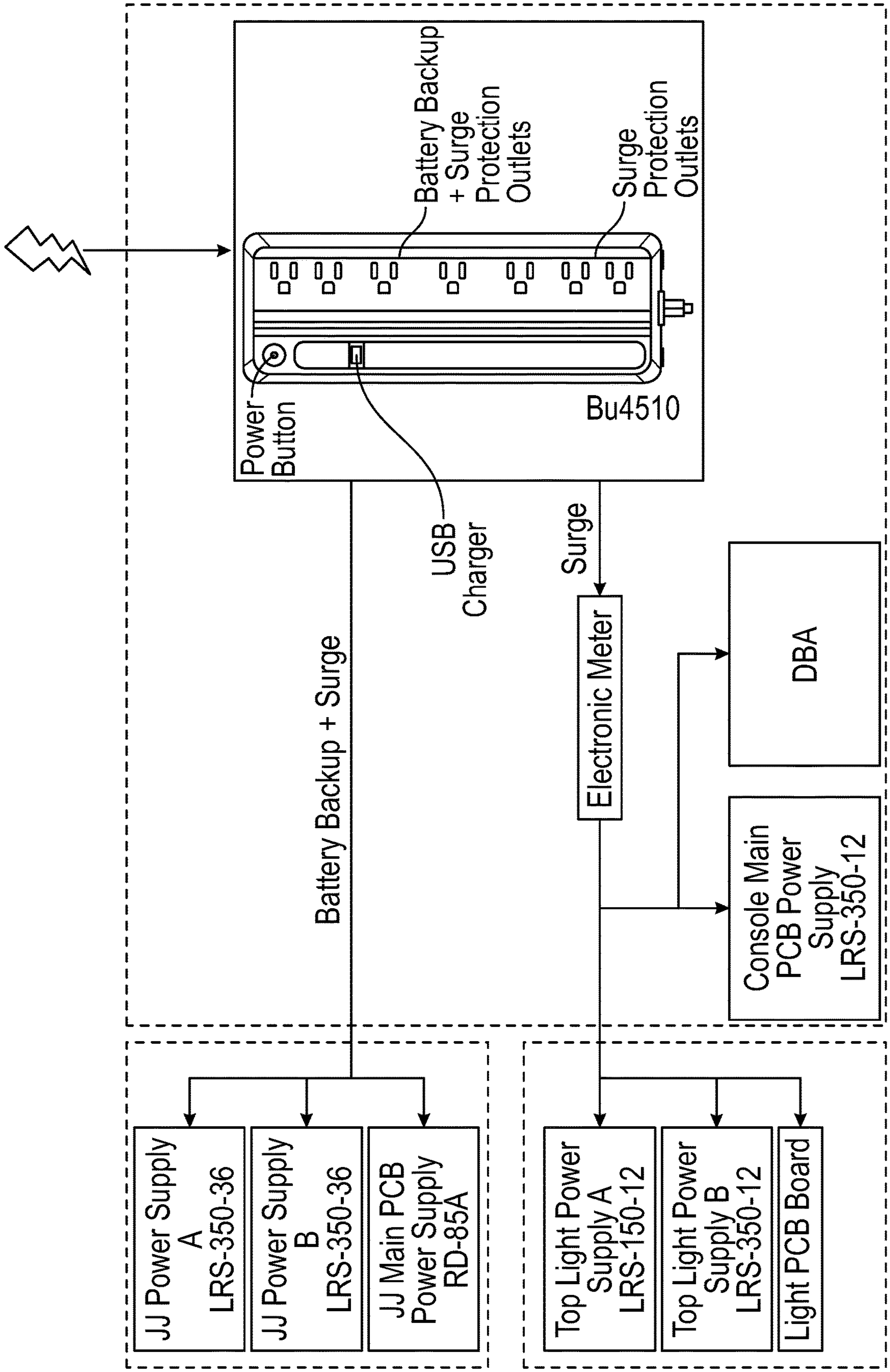
FIG. 19 is a wiring diagram for a power supply of an arcade game with a prize acquiring robot.
Figure 20:
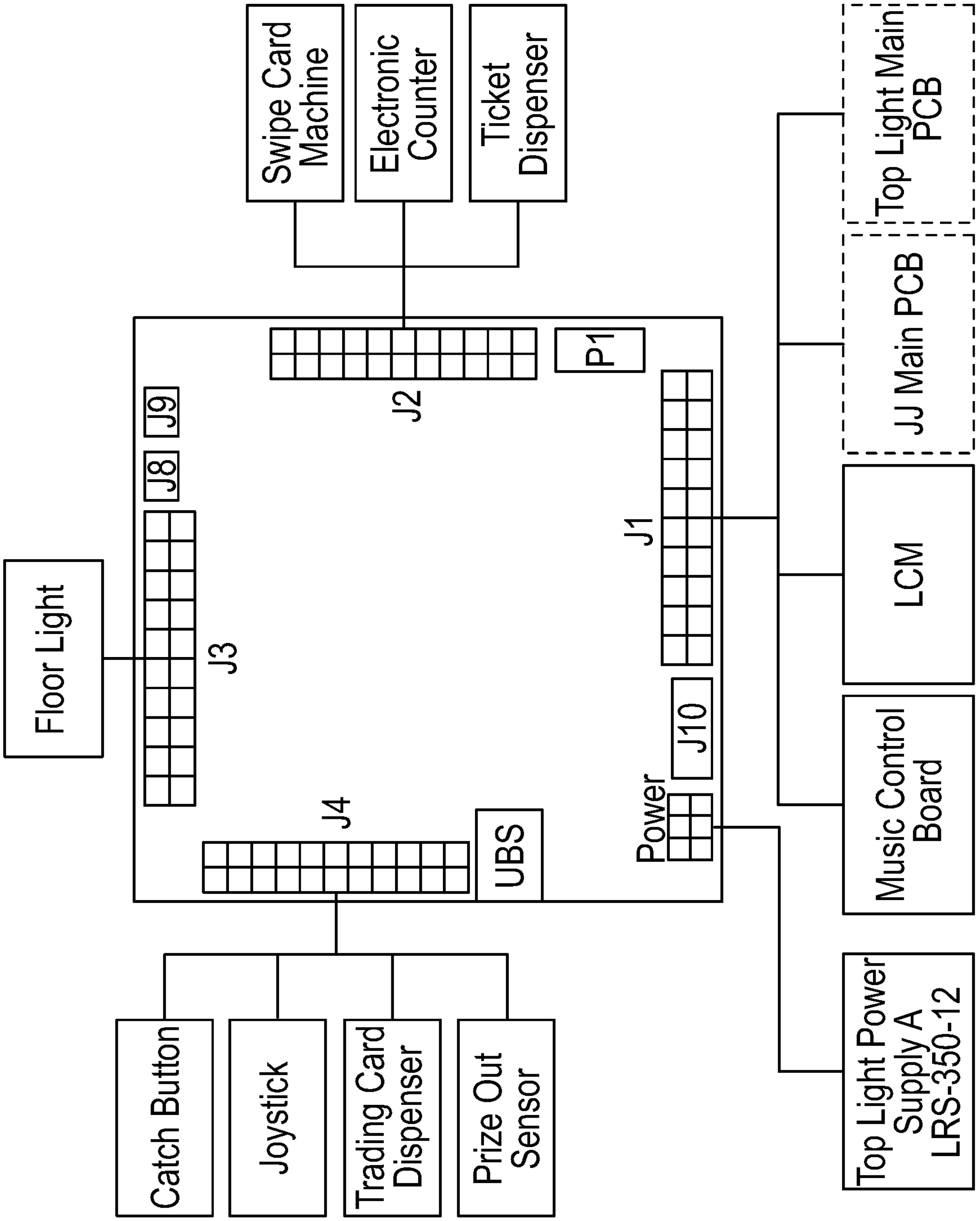
FIG. 20 is a wiring diagram for a console of an arcade game with a prize acquiring robot.
Figure 21:
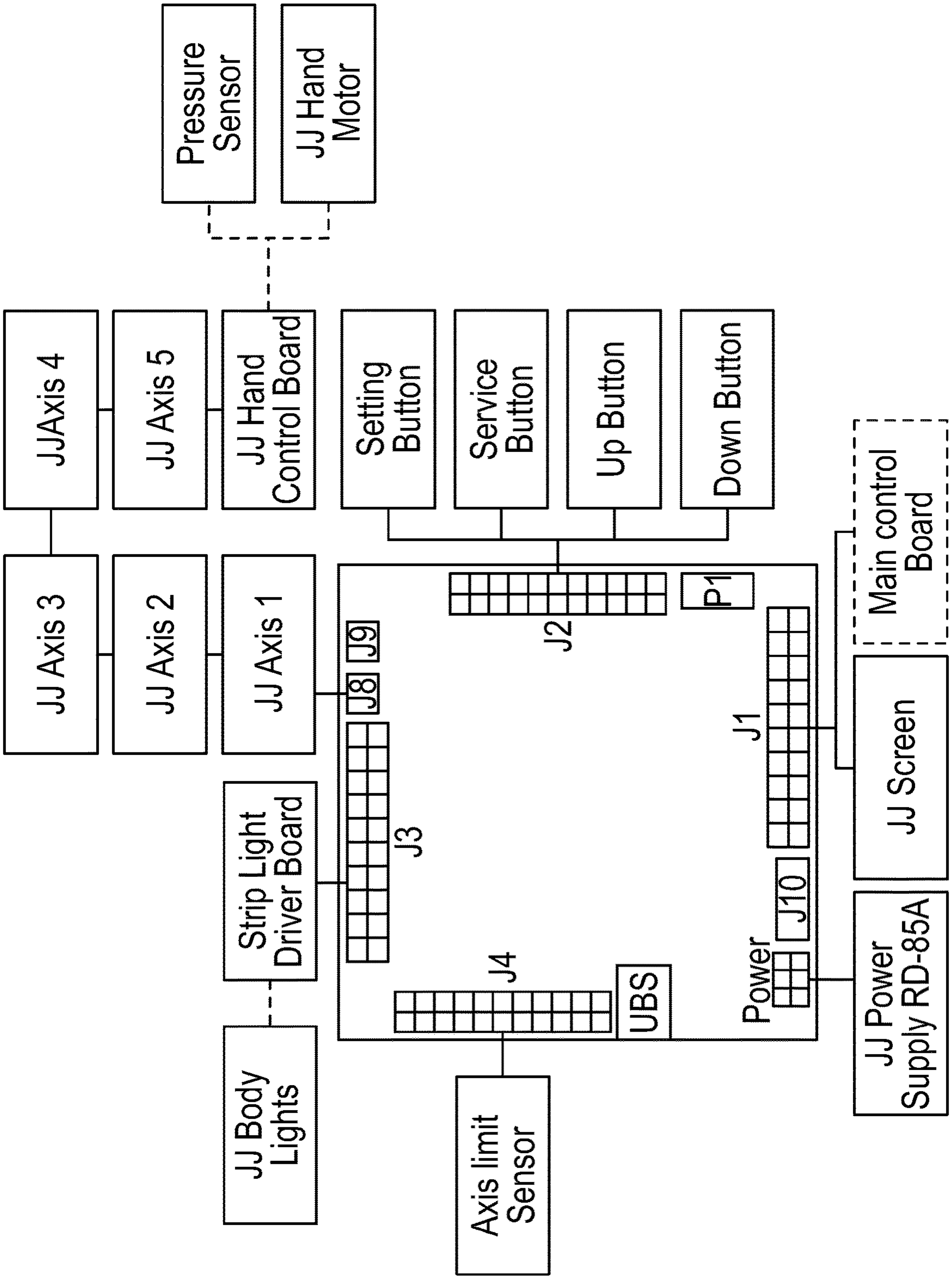
FIG. 21 is a wiring diagram for a printed circuit board for a robot for use in an arcade game.
Figure 22:
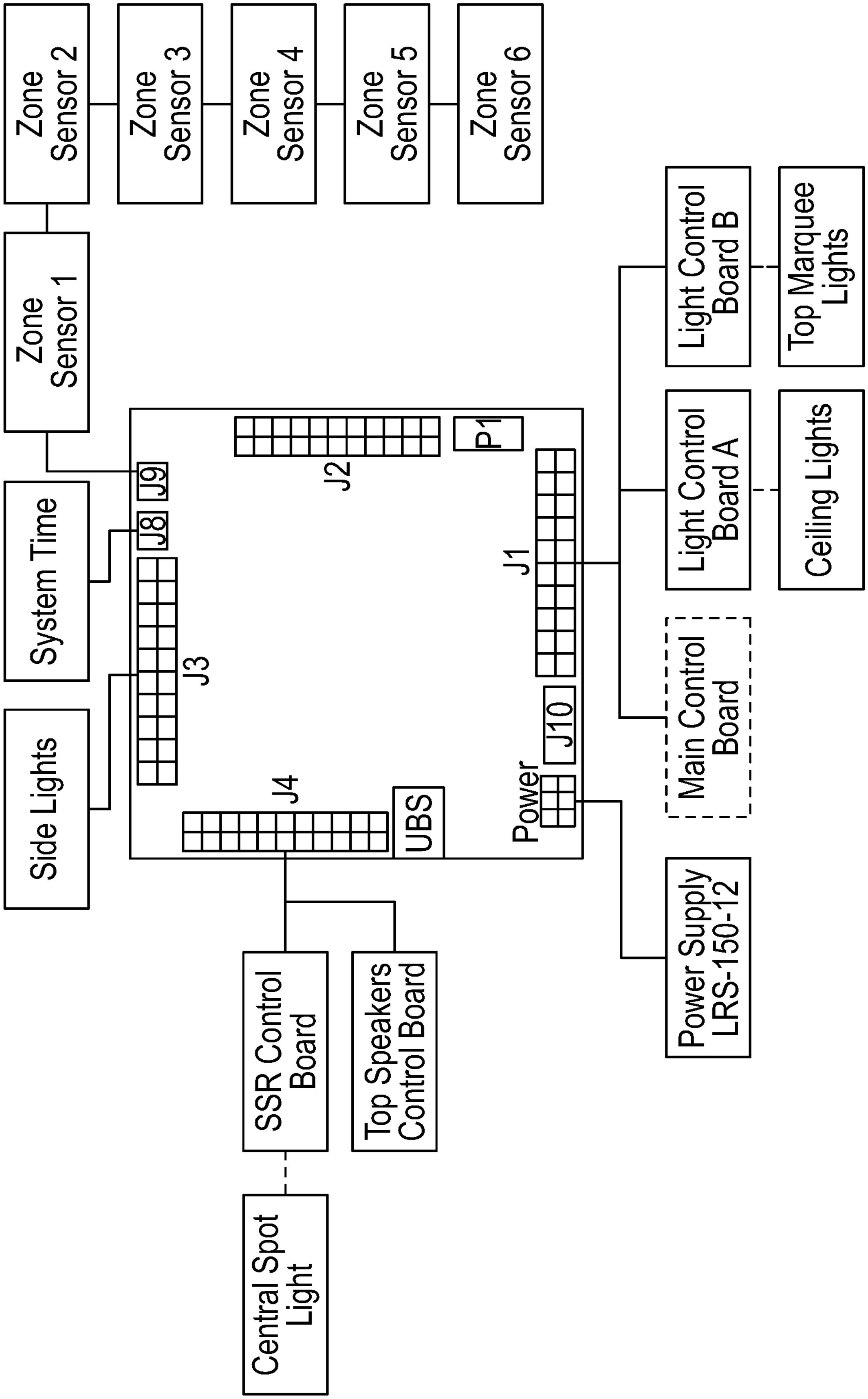
FIG. 22 is a wiring diagram for a lighting printed circuit board.

FIG. 18 shows an embodiment of a control console 26 according to one embodiment. The console 26 is adapted for attachment and removal from a game cabinet 20. The control console 26 may include a joystick 14 and button 16 that can used by a player to control the robot 12. Pressing button 16 causes the grasping portion (claw) 18 to drop down and close, hopefully capturing a prize. In a preferred embodiment the joystick 14 is generally spherical in shape with an indentation ergonomically shaped to match a player's hand. The control console 26 may also include a card reader 28 or other mechanism for receiving payment or credits from a player. The console 26 may also include a ticket dispenser 30 for providing tickets to a player. A prize door 32 may also be provided in the console 26 to permit a player to access any prizes the player has successfully captured with the robot 12. A small display screen 34 may also be provided on the console 26 to provide information to players and users that set up the machine.

FIGS. 19, 20, 21, and 22 illustrate wiring diagrams for the various elements of an embodiment of the game 10 to permit control and programming of the game 10.

Figure 23:
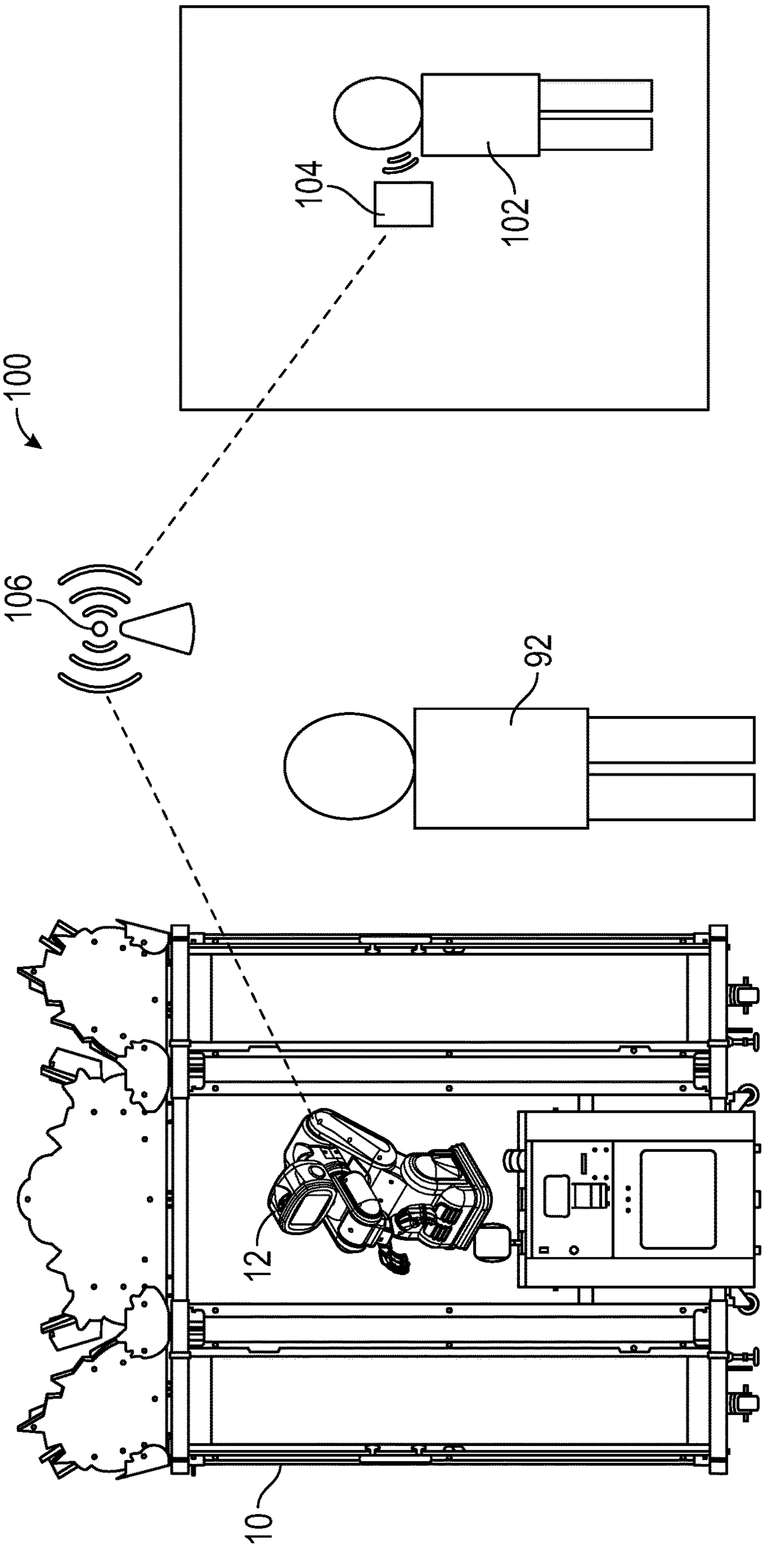
FIG. 23 is a schematic illustrating an arcade game with a robot that can be controlled and voiced by a remote user to interact in real time with a player or potential player.

FIG. 23 shows a system 100 whereby the robot 12 can be remotely controlled by a user 102 in a different location from the game 10. The system 100 would permit real time interaction between the robot 12 and a player or potential player 92. A communication device 104, such as a smart phone or computer with voice communication capabilities is connected to the robot 12 via a communication link 106, such as a cell tower or other data communication link. The user 102 would be provided video and audio feed from the game 10 and would have the ability to speak through the robot's sound system to the player or potential player 92. Accordingly the robot 12, would in effect be able to make a "personal appearance" at the game location, even though the person 102 providing the input is located in remote location.

Additional details of an embodiment of an arcade game and its operation are shown in a User's Manual attached hereto as an Appendix.

Unless defined otherwise, all technical and scientific terms used above have the same meaning as commonly understood by one of ordinary skill in the art to which embodiments of the present disclosure pertain.

The terms "a," "an," and "the" include both singular and plural referents.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An arcade game comprising:

a cabinet containing items to be captured;

a robot comprising:

a stationary base;

a foot portion mounted to rotate about a vertical axis on the base;

a lower body portion mounted to the foot portion to rotate about a first horizontal axis between the lower body portion and the foot portion;

an upper body portion having a proximal portion and a distal portion, the proximal portion of the upper body portion mounted to the lower body portion to rotate about a second horizontal axis between the lower body portion and the upper body portion;

a video display adapted to display facial features attached to the upper body portion; and a capturing mechanism mounted at the distal portion of the upper body portion, the capturing mechanism adapted to capture and release at least one of the items to be captured; and a control mechanism that permits a user to at least partially control a position of the capturing mechanism above the items to be captured by controlling an angle of rotation of the foot portion about the vertical axis relative to the stationary base and by controlling a distance of the capturing mechanism away from the vertical axis.

2. The arcade game of claim 1, wherein the distance of the capturing mechanism away from the vertical axis is controlled by rotation of the lower body portion about the first horizontal axis and rotation of the upper body portion about the second horizontal axis.

3. The arcade game of claim 1, wherein the control mechanism is mounted to an exterior of the cabinet.

4. The arcade game of claim 1, wherein the control mechanism is a portable user device programmed with an app that communicates with the robot via a wireless protocol.

5. The arcade game of claim 1, wherein the capturing mechanism comprises pincers that are selectively moved towards each other to capture an item and selectively moved away from each other to release the captured item.

6. The arcade game of claim 5, wherein each pincer comprises a removable pad.

7. The arcade game of claim 1, further comprising a swivel axis between the distal and proximal portions of the upper body portion that permits the distal portion to swivel relative to the proximal portion.

8. The arcade game of claim 7, wherein the video display is attached to the distal portion of the upper body portion.

9. The arcade game of claim 8, further comprising an optical sensor for sensing the presence of a potential player.

10. The arcade game of claim 9, wherein the robot is adapted to move the video display to face the potential player after sensing the presence of the potential player.

11. The arcade game of claim 8, wherein the video display includes a speaker and is programmed to play a message that simulates the robot talking to the potential player.

* * * * *